No. 660,186. Patented Oct. 23, 1900.
F. G. GOETTMANN, SR.
BRAKE FOR VEHICLES.
(Application filed Aug. 31, 1900.)
(No Model.) 3 Sheets—Sheet 1.
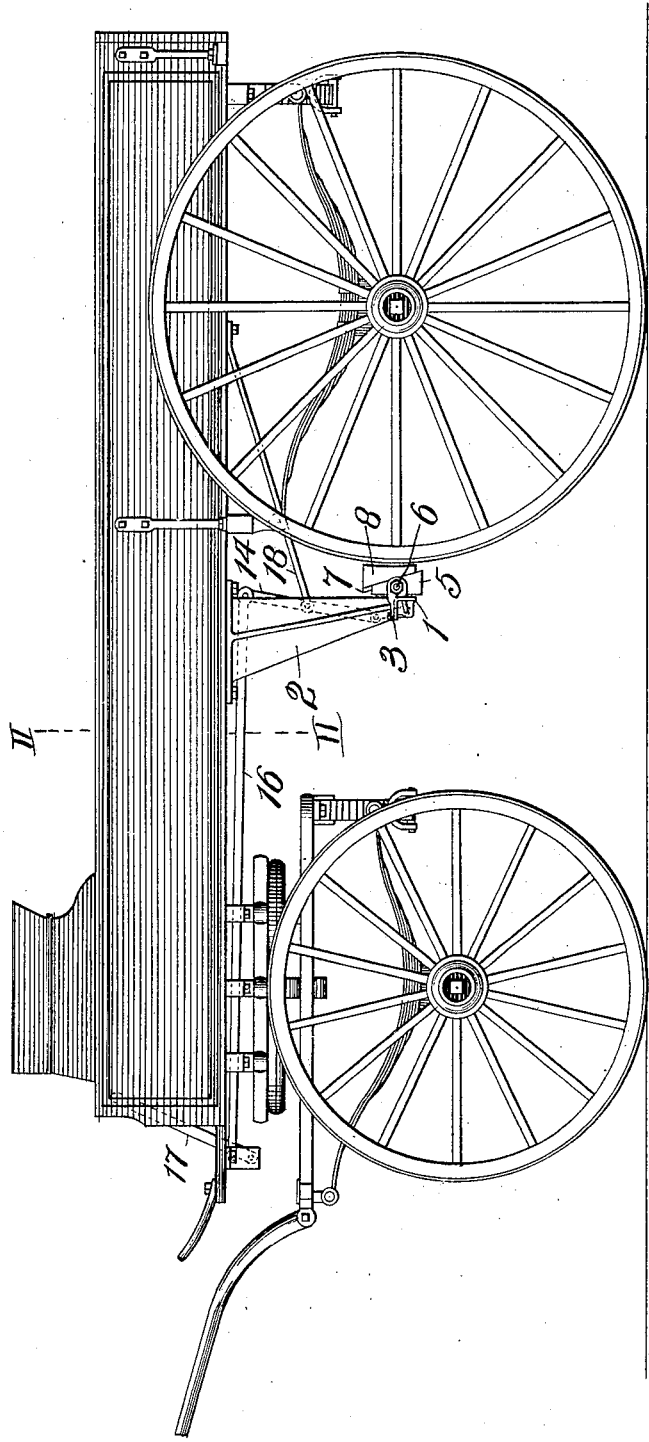
FIG. I.
WITNESSES:
Herbert Bradley
F. M. Dapper
INVENTOR
Frederich G. Goettmann Sr.
by Dennis B. Wolcott Att'y.

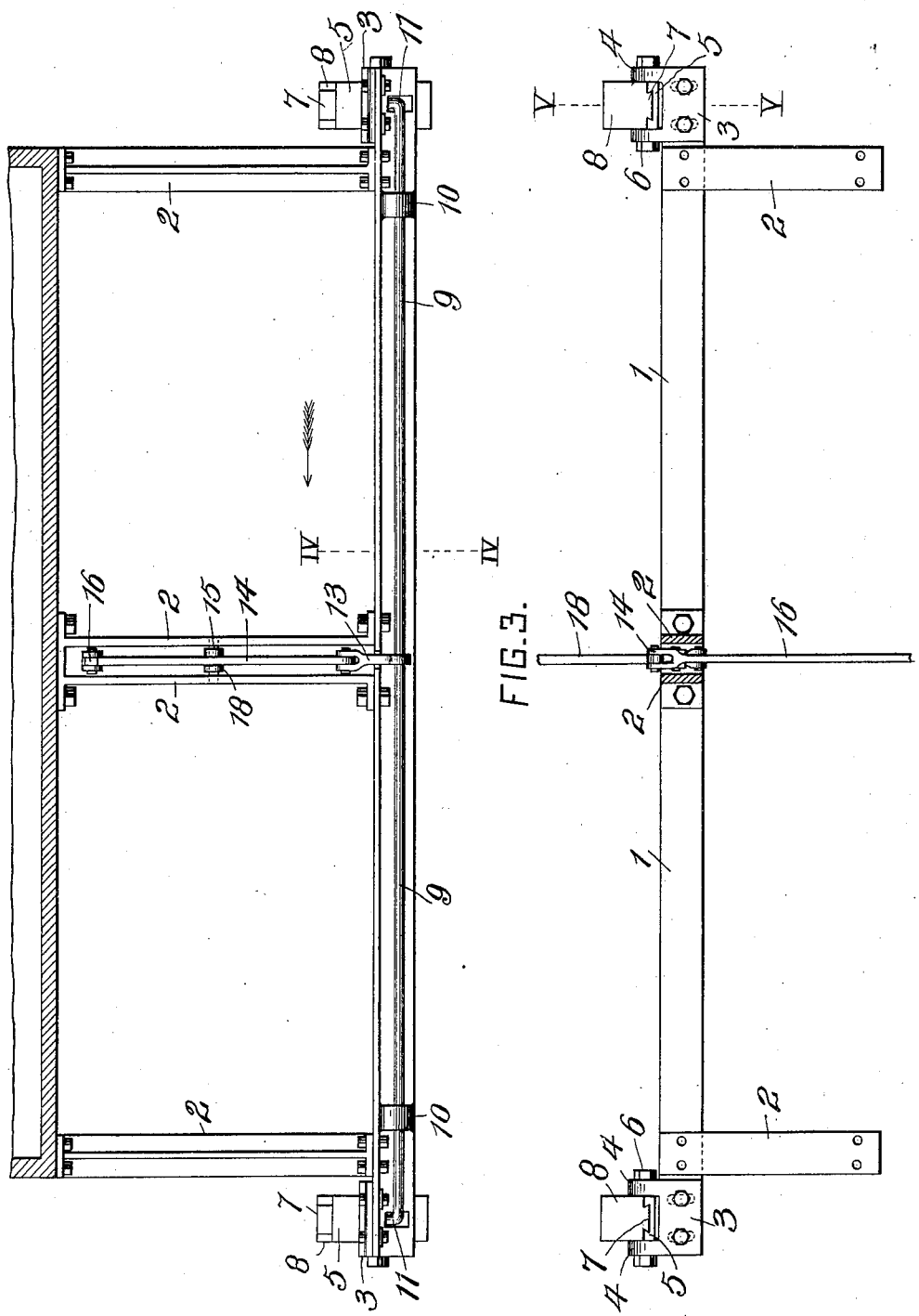

No. 660,186. Patented Oct. 23, 1900.
F. G. GOETTMANN, Sr.
BRAKE FOR VEHICLES.
(Application filed Aug. 31, 1900.)
(No Model.) 3 Sheets—Sheet 3.
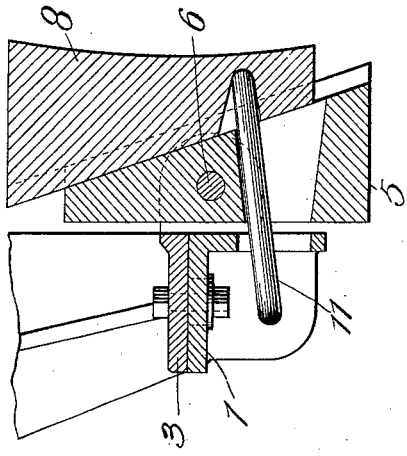
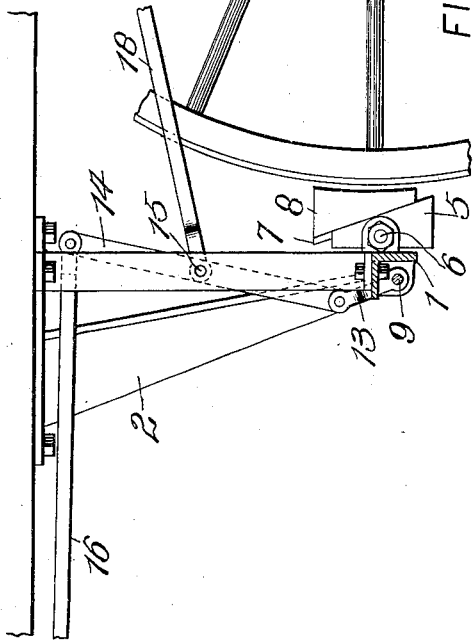
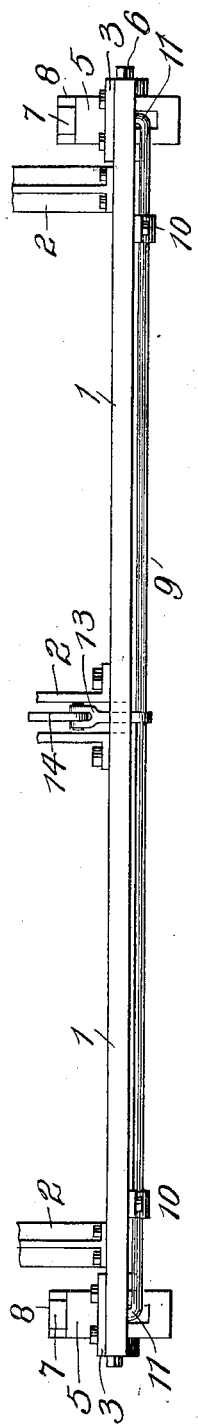
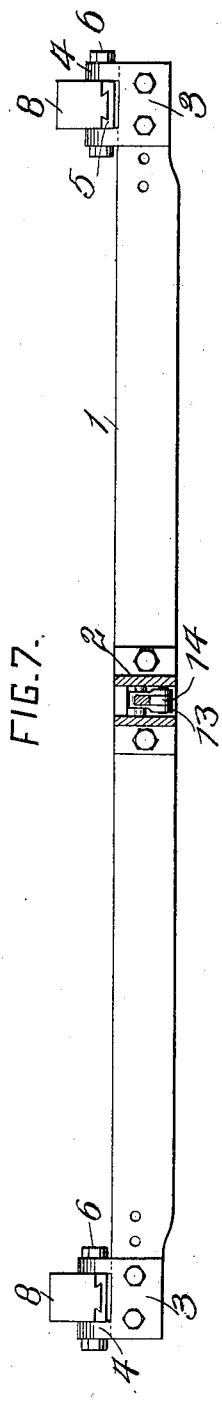
WITNESSES: INVENTOR

UNITED STATES PATENT OFFICE.

FREDERICK G. GOETTMANN, SR., OF ALLEGHENY, PENNSYLVANIA.

BRAKE FOR VEHICLES.

SPECIFICATION forming part of Letters Patent No. 660,186, dated October 23, 1900.

Application filed August 31, 1900. Serial No. 28,644. (No model)

*To all whom it may concern:*

Be it known that I, FREDERICK G. GOETTMANN, Sr., a citizen of the United States, residing at Allegheny, in the county of Allegheny and State of Pennsylvania, have invented or discovered certain new and useful Improvements in Brakes for Vehicles, of which improvements the following is a specification.

The invention described herein relates to certain improvements in brakes for vehicles—such as wagons, carriages, &c.—and has for one object a construction whereby the brake may be applied with comparatively-little exertion on the part of the operator and will be caused to grip harder by the action of the wheel drawing the shoe down between the relatively-stationary abutment and the wheel itself.

It is a further object of the invention to provide for an easy release of the brake and to permit the shoe to accommodate itself to irregularities of wear, thereby obtaining a more uniform bearing upon the wheel.

The invention is hereinafter more fully described and claimed.

In the accompanying drawings, forming a part of this specification, Figure 1 shows a side elevation of a wagon having my improved brake mechanism applied thereto. Fig. 2 is a sectional view on a plane indicated by the line II II, Fig. 1. Fig. 3 is a plan view of the brake mechanism, the middle supporting-bars being broken away. Fig. 4 is a sectional view, on a plane indicated by the line IV IV, Fig. 2, looking in the direction of the arrow *a*. Fig. 5 is a sectional view, on an enlarged scale, on a plane indicated by the line V V, Fig. 3. Figs. 6 and 7 are views similar to Figs. 2 and 3, showing the brake-beam formed of wood.

In the practice of my invention the brake-beam 1, which is preferably formed of a section of angle-iron, as shown in Figs. 1 to 5, inclusive, but may be formed of wood, as shown in Figs. 6 and 7, is secured to the lower ends of brackets 2, having their upper ends bolted to the body of the wagon, as shown. On each end of the brake-beam 1 is bolted an adjustable plate 3, provided with rearwardly-projecting arms 4, between which is mounted a wedge-shaped block or abutment 5. The blocks 5 are so constructed and pivotally mounted upon the pins 6 as to be capable of a rocking movement, as hereinafter described. The blocks or abutments 5 have dovetailed grooves formed in their rear faces for the reception of correspondingly-shaped ribs 7, formed on the rear faces of the brake-shoes 8, thereby permitting of the movement of the brake-shoes up and down along the abutments, but held constantly in engagement therewith. A shaft 9, arranged parallel with the brake-beam and mounted in suitable bearings 10, secured to the brake-beam, is provided at its ends with arms 11, projecting through vertical slots in the brake-beam and abutments, as clearly shown in Fig. 5, and into V-shaped sockets in the rear of the brake-shoes 8.

It will be readily understood by the foregoing that by the rotation of the shaft 9 the arms 11 will impart a vertical movement to the brake-shoes along the blocks or abutments 5. A downward movement will force the brake-shoes in between the wheel and blocks, and this downward movement will be assisted by the movements of the wheels so soon as the rubbing surfaces of the blocks come into contact with the faces of the wheels. As the brake-shoes become unevenly worn, the pivotal mounting of the abutment will permit the brake-shoe and abutment to move so as to compensate for any uneven wearing and to permit the shoes to bear evenly on the wheels.

The rotation of the shaft to effect the up-and-down movement of the brake-shoe is effected by means of an arm 13, secured to the shaft 9 at any suitable point between its ends. The outer end of this arm is connected to one end of a lever 14, which is pivotally mounted on a pin 15, passing through the middle braces or brackets 2. The upper end of the lever is connected by rod 16, extending to the front end of the wagon, where it is connected in any suitable manner to an operating-handle 17. It is preferred in order to strengthen the brackets or braces 2 as against the strain incident to the application of the brakes to employ an auxiliary brace 18, which preferably extends from the pivot-pin 15 to the body or rear axle of the wagon, as clearly shown in Fig. 1.

By reference to Fig. 5 it will be seen that the outer ends of the arms 11 bear upon the brake-shoes outside of the pivot-pins 6, so that when these arms are raised they not only tend to slide the brake-shoes upward along the blocks or abutments 5, but also to rock the upper ends of the brake-shoes and abutments away from the wheel, thereby rendering the release of the brake-shoes the more easy. As will be seen by reference to Fig. 3, the plates or carriers 3 are slotted, so as to permit of the adjustment of the abutments and brake-shoes toward or from the wheel.

I claim herein as my invention—

1. A brake for wagons, &c., having in combination a beam, abutments pivotally mounted on the beam, shoes movably mounted on the abutments or blocks, and a shaft mounted on the beam and provided with arms engaging the shoes, substantially as set forth.

2. A brake for wagons, &c., having in combination a beam, plates adjustably mounted on the beam, blocks or abutments pivotally mounted on the plates, shoes movably mounted on the blocks or abutments and a shaft mounted on the beam and provided with arms engaging the shoes, substantially as set forth.

3. A brake for wagons, &c., having in combination a beam, abutments pivotally mounted on the beam, shoes movably mounted on the blocks or abutments, a shaft mounted on the beam and provided with arms engaging the shoes, a lever for rotating said shaft and a brace extending from the pivot-pin of the lever to a portion of the wagon, substantially as set forth.

In testimony whereof I have hereunto set my hand.

FREDERICK G. GOETTMANN, SR.

Witnesses:
DARWIN S. WOLCOTT,
M. S. MURPHY.